United States Patent Office 3,533,920
Patented Oct. 13, 1970

---

3,533,920
ALUMINUM ARTICLES HAVING A POLYMERIC FLUOROHYDROCARBON SURFACE AND PROCESSES FOR PREPARING THE SAME
Charles P. Covino, Upper Montclair, N.J., assignor to General Magnaplate Corporation, Belleville, N.J., a corporation of New Jersey
No Drawing. Filed June 1, 1966, Ser. No. 554,353
Int. Cl. B44d 1/092, 1/098; C23b 9/02
U.S. Cl. 204—38                              10 Claims

---

ABSTRACT OF THE DISCLOSURE

The present invention provides a novel process for preparing novel composite aluminum articles having an inner layer of aluminum, an intermediate layer of aluminum oxide, and an outer layer of polymeric fluorohydrocarbon resinous material. The process utilizes a specified novel aqueous sulphuric acid anodizing bath in which the intermediate layer of the composite article is formed. The composite article is then immersed in an aqueous resin impregnation tank to form the outer layer. The invention specifically includes the overall process, the anodizing process, the novel anodizing bath, and the novel composite article.

---

The present invention is directed to aluminum articles having a polymeric fluorohydrocarbon surface and to processes for preparing said articles.

It is an object of the present invention to provide improved aluminum articles having a polymeric fluorohydrocarbon surface.

It is also an object of this invention to provide processes for preparing said articles.

Other objects and advantages of the invention will be obvious and in part be apparent from the disclosure herein.

In its broadest aspects, the invention contemplates providing composite aluminum articles having a polymeric fluorohydrocarbon surface. The composite articles are largely aluminum with an oxide coating on the aluminum, and an outer polymeric surface which is intimately and strongly bonded to the oxide coating. The process of the present invention contemplates the preparation of a porous aluminum oxide surface on the aluminum which has special capabilities to intimately bond with the polymeric materials forming the outer surface.

The process of the invention is suitable for the preparation of composite aluminum articles prepared from a wide range of available aluminum alloys, including wrought, cast and forged aluminum. The aluminum metal surface is first cleaned to remove dirt, smut, oxide coating, etc. by suitable methods including those used for preparing aluminum for anodizing. The cleaning treatment varies for different aluminum alloys. The treatment generally provides for degreasing, oxide removal in mild caustic, and removal of surface smut in an acid solution.

The irregular, porous oxide coating integral with the aluminum surface is grown therefrom by anodic treatment of the aluminum in an oxidizing sulfuric acid bath utilizing relatively high voltages and high current densities, to obtain a highly absorptive oxide layer at least 0.0005 inch and preferably at least .001 inch. For special purposes, the oxide layer may be made thicker, e.g., 0.002 inch. When the desired oxide layer has been obtained, the article is removed from the acid tank, rinsed, and while still wet dipped into an aqueous solution containing finely subdivided polymeric fluorohydrocarbon material, and maintained in said solution until the interstices in the oxide layer absorb and are filled with the polymeric material and a top surface coating of at least about 0.0003 inch and preferably 0.0005 inch is formed. The oxide layer is formed from the surface of the aluminum and becomes bonded to and integral with the polymer by intimate contact with the irregular porous surface.

The oxidizing bath should contain between 4% and 6%, and preferably about 5% by volume of sulfuric acid (66° Baumé); between 0.5% and 3% of oxalic acid; between 0.5% and 3% of salicylic acid; and between 5 grams and 25 grams per gallon of tannic acid. The bath may also include between 0.5% and 3% of succinic acid; between 0.25% and 3% of sulfanilic acid; and small amounts of a sugar and of a wetting agent, e.g., between 5 grams and 25 grams per gallon of sucrose per gallon, and about 0.5 gram per gallon of wetting agent. Obviously, the sulfuric acid content of the bath may be supplied by acid of a strength other than the commonly available 66° Baumé acid.

During the formation of the oxide coating, the bath is highly agitated. It is also important that the bath contain relatively high concentrations of dissolved oxygen and preferably also dissolved carbon dioxide. This is accomplished by passing large quantities of air, e.g., one cubic foot (or more) per minute of air per gallon of solution, through the bath to provide the agitation and to supply the gases to the bath.

The bath may be operated at temperatures between about 25° F. and 80° F. The preferred temperature varies for different aluminum alloys and process conditions. Low temperatures are preferred when oxidizing at high current density and voltage. Temperatures below about 65° F., and preferably about 35° F. and 45° F., are preferred. The temperature tends to rise during the process when applying high current densities. The oxidation process usually requires at least 18–20 minutes and may be as much as an hour and a half, dependent upon the alloy being treated, the current density and voltage utilized, the desired oxide thickness, etc. The voltage utilized varies from about 20 to about 130 volts, and preferably about 60 volts. The amperage may vary from about 10 amps/sq. ft. to about 150 amps/sq. ft., and is preferably about 25 amps/sq. ft. to 120 amps/sq. ft. during most of the cycle. The initial desired current density is obtained on the aluminum metal surface at relatively low voltages.

As the oxide coating is formed, the electrical resistance increases markedly requiring substantially higher voltages to obtain the requisite current densities. Consequently, the voltage is continuously increased during the processing cycle. Upon removal from the oxide-forming bath, the article is rinsed until the acid remaining in the interstices of the crystals and pores is removed and/or neutralized. The article is then immersed in the polymeric fluorohydrocarbon impregnation tank.

When the aluminum oxide is formed utilizing the afore-described process, aluminum oxide crystals are grown from the aluminum crystals at the surface of the article. The oxide crystals grow inwardly from the surface, and also outwardly. The oxide formed is in a highly porous and absorptive form, being basically a sponge-like deposit. The outer surface of the crystal formed is more amorphous and is not hard as the aluminum oxide formed in conventional hard anodizing processes. The actual surface of the oxide is in the form of the alpha monohydrate of aluminum oxide. This monohydrate forms during the oxide growing process and/or during the aqueous treatment following the anodizing process. The highly absorptive crystals form an irregular layer. The growth of this layer is dependent upon the time during which the oxidizing current is impressed, as well as the applied voltage and amperage; higher voltage and amperage resulting in a thicker oxide coating.

The impregnation tank contains an aqueous solution of the polymeric fluorohydrocarbon. The concentration of the polymeric material in the solution may vary widely. As little as one pound of polymeric material per 100 pounds of water has been found to be operative. The preferred operating range is between about 10% and 35% by weight of polymeric material in the water. Higher concentrations, for example, up to about 50% by weight, are operative. However, at higher concentrations, processing difficulties are encountered attributable to the syrup-like characteristics of the bath. The polymeric material should be finely subdivided so that it will be absorbed by and packed by molecular attraction into the fine interstices and pores of the absorptive aluminum oxide. For this purpose, particles up to about 2 microns in size may be used. It is preferred that the particle size be below 1 micron. The use of particles having more than 50% of minus 0.5 micron is especially preferred. Useful results have been obtained with available dispersons having particles of 0.2 micron and less.

The polymer impregnation tank is operated at temperatures from about 110° F. up to about 180° F., the upper limit is preferably 160° F. with optimum properties obtained with temperatures between 125° F. and 140° F. The immersion time is preferably between about 10 and 30 minutes to obtain the desired surface, about 0.0002 inch thick. Longer immersion time results in the slow build-up of the layer to thicknesses such as 0.0003 inch, 0.0005 inch, etc.

The materials referred to as the polymeric fluorohydrocarbon materials utilized in the present invention, are fluorine-containing hydrocarbon homopolymers and copolymers. These include polytetrafluoroethylene, polytetrafluoroethylene - polyhexafluoroethylene copolymer, etc. The polytetrafluoroethylene is preferred. These materials are sold by the E. I. Du Pont de Nemours & Company under the trademark "Teflon."

The polymeric surface article is air dried after removal from the impregnation tank. The dried composite article is preferably baked in an oven at temperatures between about 350° up to about 750° C. Such treatment results in formation of a dry, tough film. Treatment at about 750° F. improves the film by a "sintering" effect.

Additional thicknesses of the fluorinated hydrocarbon surface may be built up by spraying the polymeric material in a suitable vehicle onto the air dried coating prepared in the aqueous impregnation tank. The vehicle may be a fluid organic material in which the resin is dispersed and/or dissolved. The vehicle is preferably volatile. Aqueous dispersons are preferred. The particles utilized may be of the same order of subdivision utilized in the impregnation tank or they may be larger particles.

The invention is further illustrated in the following three examples:

A common processing sequence was used in the examples. They differed in the aluminum alloy treated, and in the voltage-current density cycle during the formation of the aluminum oxide. In each case, the aluminum article was first degreased and then dipped into an aqueous solution containing 4 ounces of caustic for 15 minutes. The solution was at 185° F. This was followed by a cold water rinse at room temperature. Surface smut was removed by a short dip in a dilute aqueous acid (chromic acid-nitric acid) bath at 130° F. The aluminum article was then rinsed at room temperature and dipped into the oxide forming bath.

The bath was an aqueous bath containing about 5% by volume of 66 Baumé sulphuric acid, 2% oxalic acid, 1.5% salicylic acid, about 15 grams per gallon of tannic acid, and about 0.5 gram of a wetting agent. The bath temperature was generally maintained between about 35° F. and 45° F., although during portions of the cycle utilizing very high current densities, there was a marked tendency for the temperature to rise resulting in temporary increases above the preferred temperature range. The time of oxide formation, the current densities, and the voltages utilized are specifically noted for each of the examples. The aluminum article was then removed from the acid bath, rinsed and dipped into an aqueous immersion bath containing about 20% by weight of polytetrafluoroethylene. The particle size of this polymer was almost 100% below 1 micron, with a major portion thereof having a particle size below 0.5 micron. The immersion bath was maintained at a temperature of about 130° F. The aluminum articles were maintained in the bath for about 15 minutes. The articles were then dried over a hot air blower. An additional thickness of polymer was added by spraying an aqueous solution containing about 20% by weight of minus 1 micron particles of a copolymer of polytetrafluoroethylene with polyhexafluoroethylene. The sprayed parts were then dried and heated to about 750° to sinter the polymer.

EXAMPLE I

Two aluminum panels, each having an area of 16 square inches, composed of 606IT6 anodizing grade aluminum was treated in the oxide forming bath for 20 minutes in accordance with the following cycle, to form an oxide layer 0.0022 inch thick:

| Time (minutes) | Volts | Amperes |
|---|---|---|
| 0 (start) | 20 | 10 |
| 5 | 30 | 20 |
| 10 | 35 | 30 |
| 15 | 40 | 25 |
| 20 (stop) | 60 | 20 |

EXAMPLE II

An aluminum panel having a total area of 1.8 square feet (266.9 square inches), was processed for 22 minutes in the oxide forming bath until it attained an oxide thickness of 0.0017 inch. The voltage amperage cycle utilized follows:

| Time (minutes) | Volts | Amperes |
|---|---|---|
| 0 (start) | 20 | 20 |
| 4 | 25 | 60 |
| 10 | 30 | 110 |
| 15 | 34 | 105 |
| 22 (stop) | 45 | 90 |

EXAMPLE III

Sixteen aluminum plates were treated in the oxide forming tank for 22 minutes to attain an average oxide coating of 0.0017 inch thick. The area of each plate was 150 square inches, for a total of 16.6 square feet for the sixteen pans. The voltage-amperage cycle utilized follows:

| Time (minutes) | Volts | Amperes |
|---|---|---|
| 0 (start) | 20 | 160 |
| 5 | 25 | 800 |
| 10 | 29 | 1,200 |
| 15 | 35 | 1,380 |
| 22 (stop) | 45 | 1,020 |

The entire surfaces of all the articles treated in the examples were treated. The product, described in more detail for the plates of Example III, is a grey-black smooth, slippery surface. The polymer coating is tenaciously bonded to the metal article. It is very difficult to remove, e.g., scrubbing with steel wool only removes the outer surface. Sand blasting is required to fully remove it. The treated plates have unusual and superior properties. It is possible to fry meat until it is charred with little or no fuming. This is attributed to the unusually high heat transfer characteristics of the treated aluminum article.

The treated articles are also extremely slippery, reflecting a low coefficient of friction. They are highly corrosion resistant. These properties, combined with the extremely tenacious bond between the polymer and the base, provide a composite article superior to other cooking utensils.

As many embodiments of this invention may be made without departing from the spirit and scope thereof, it is understood that the invention includes all such modifications and variations as come within the scope of the appended claims.

What is claimed is:

1. The process for preparing a composite aluminum article having an inner layer of aluminum, an intermediate layer of aluminum oxide, and an outer layer of resinous material comprising
   (i) cleaning the surface of said aluminum metal;
   (ii) forming an aluminum oxide coating integral with and on said aluminum metal by making said cleaned aluminum anodic in an aqueous acid bath at a temperature between 25° and 85° F. and containing between 4% and 6% by volume of 66° Baumé sulfuric acid, between 0.5% and 3% of oxalic acid, and between 5 grams and 25 grams per gallon of tannic acid; by impressing a voltage of between about 20 and 130 volts and sufficient to apply an anodic current density from about 20 amps/sq. ft. to 150 amps/sq. ft. until a coating at least about 0.001 inch is obtained, and then rinsing said article; and then
   (iii) immersing said oxide coated aluminum in an aqueous impregnation tank containing dispersed polymeric fluorohydrocarbon particles up to about one micron in size, until said polymeric particles fill the interstices and pores of the oxide layer and forms an outer coating at least about 0.0001 inch thick.

2. The process of claim 1 wherein air is passed through said aqueous acid bath in an amount of at least one cubic foot per minute.

3. The process of claim 2 wherein said aqueous acid bath temperature is between 35° F. and 45° F.

4. The process of claim 3 where said voltage is between 20 and 60 volts, and said current density is between 25 amperes per square foot and 120 amperes per square foot.

5. The process of claim 4 wherein said polymeric impregnation bath is at a temperature between about 125° F. and 140° F., and contains between 10% and 35% by weight of said polymeric material.

6. The process of claim 5 wherein said aqueous acid bath contains between 0.5% and 3% by volume of succinic acid, between 0.25% and 3% of sulfanilic acid, and small effective amounts of sucrose and of a wetting agent.

7. The process of claim 5 wherein said aqueous acid bath contains about 5% sulfuric acid, 1.5% salicylic acid, and 15 grams per gallon of tannic acid.

8. The process of claim 6 wherein said aqueous acid bath contains about 5% sulfuric acid, 1.5% salicylic acid, and 15 grams per gallon of tannic acid.

9. A composite aluminum article having a tenaciously adherent polymeric fluorohydrocarbon surface prepared by the process of claim 1.

10. A composite aluminum article having a tenaciously adherent polymeric fluorohydrocarbon surface prepared by the process of claim 7.

References Cited

UNITED STATES PATENTS

| 2,542,069 | 2/1951 | Young | 204—38 XR |
| 2,745,898 | 5/1956 | Hurd | 204—38 XR |
| 2,977,294 | 3/1961 | Franklin | 204—42 |
| 3,330,743 | 7/1967 | Jestl et al. | 204—33 |
| 3,390,063 | 6/1968 | Working | 204—58 |

OTHER REFERENCES

Mason et al.: Aluminum Research Laboratories, New Kensington, Pa., pp. 53–58.

JOHN H. MACK, Primary Examiner

W. VAN SISE, Assistant Examiner

U.S. Cl. X.R.

204—58